June 26, 1956 A. F. HICKMAN 2,752,166
VEHICLE SPRING SUSPENSION OF THE SHEAR RUBBER TYPE
Filed July 10, 1952 10 Sheets-Sheet 5
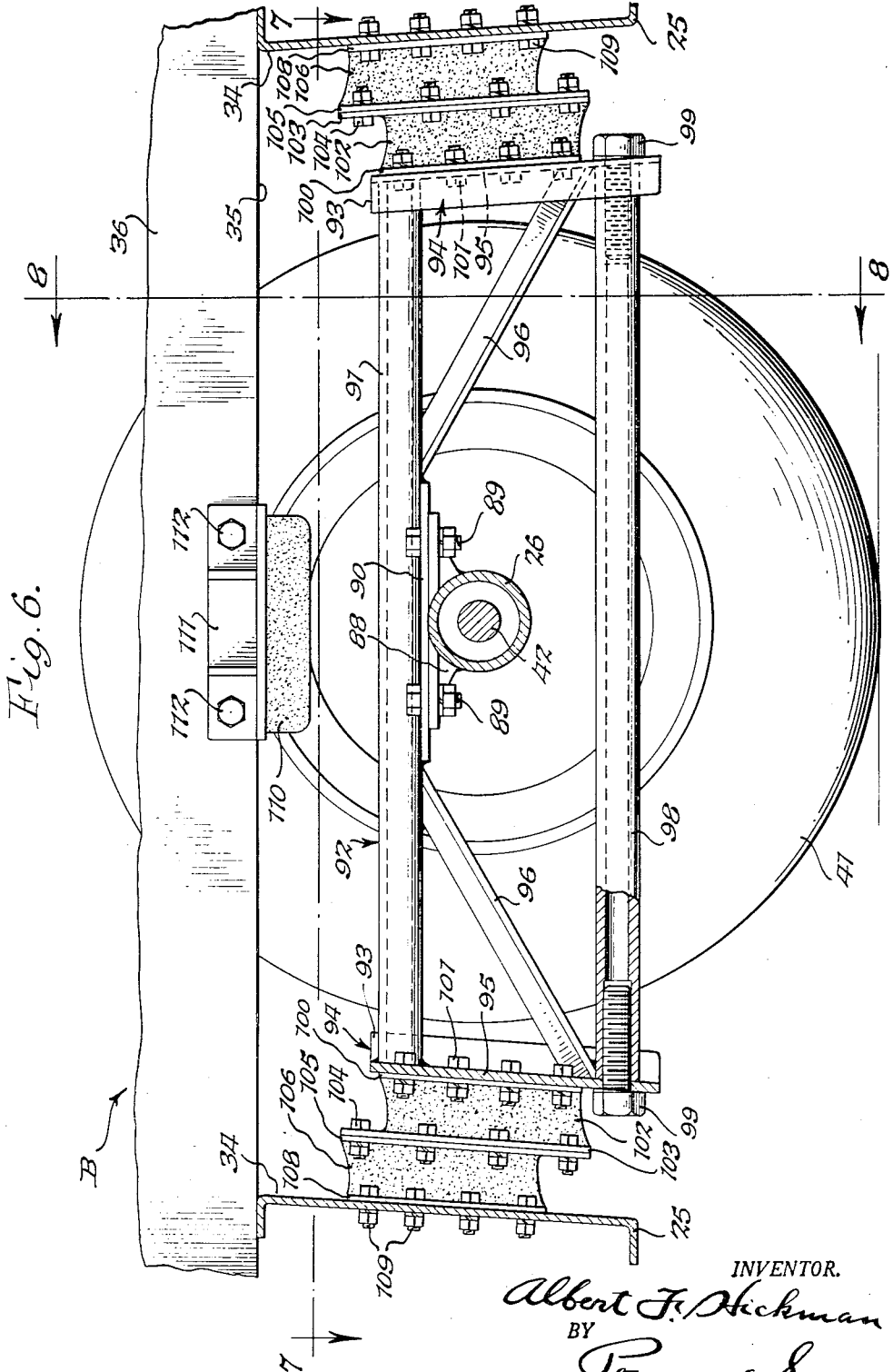
INVENTOR.
Albert F. Hickman
BY
Popp and Sommer
ATTORNEYS

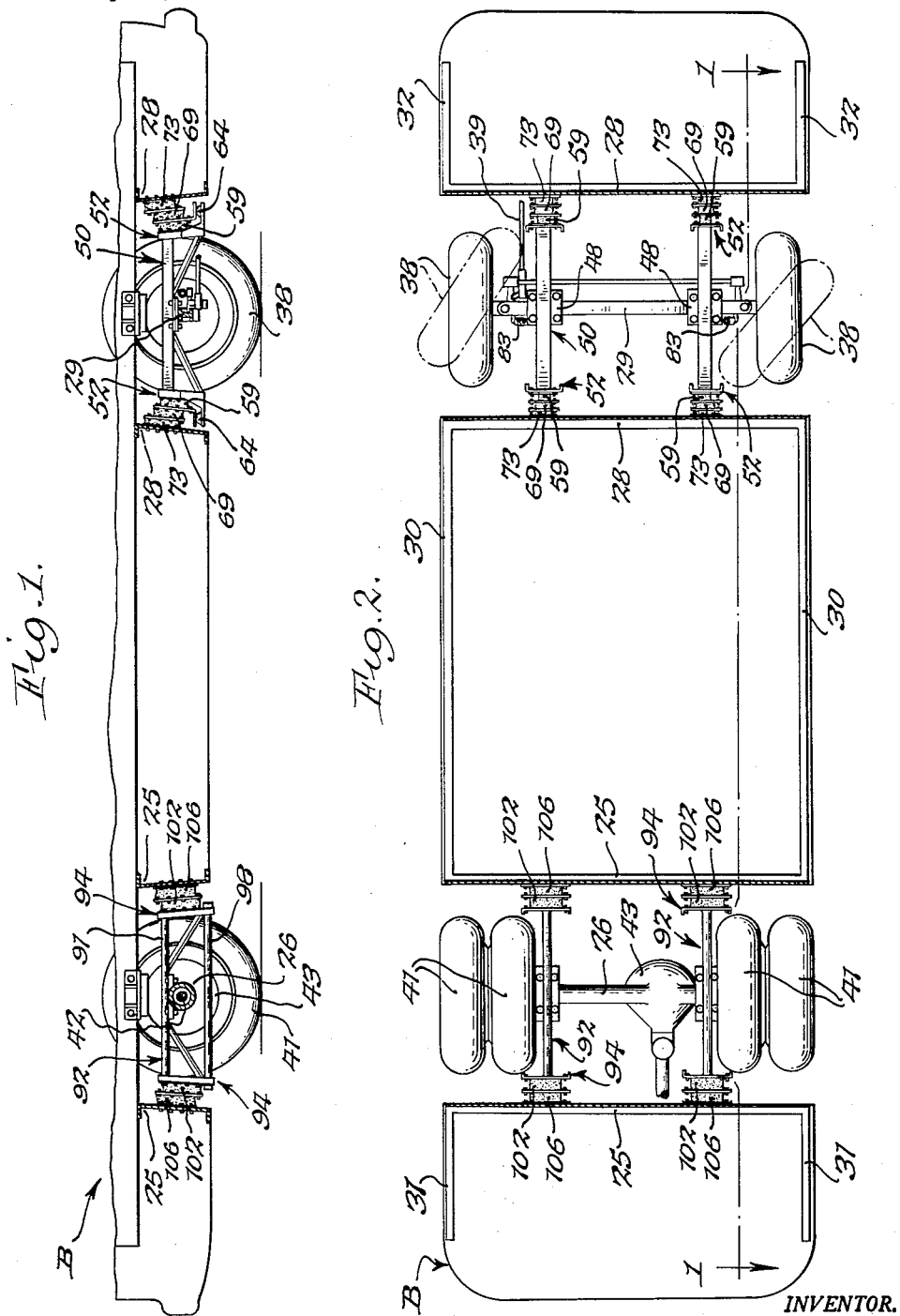

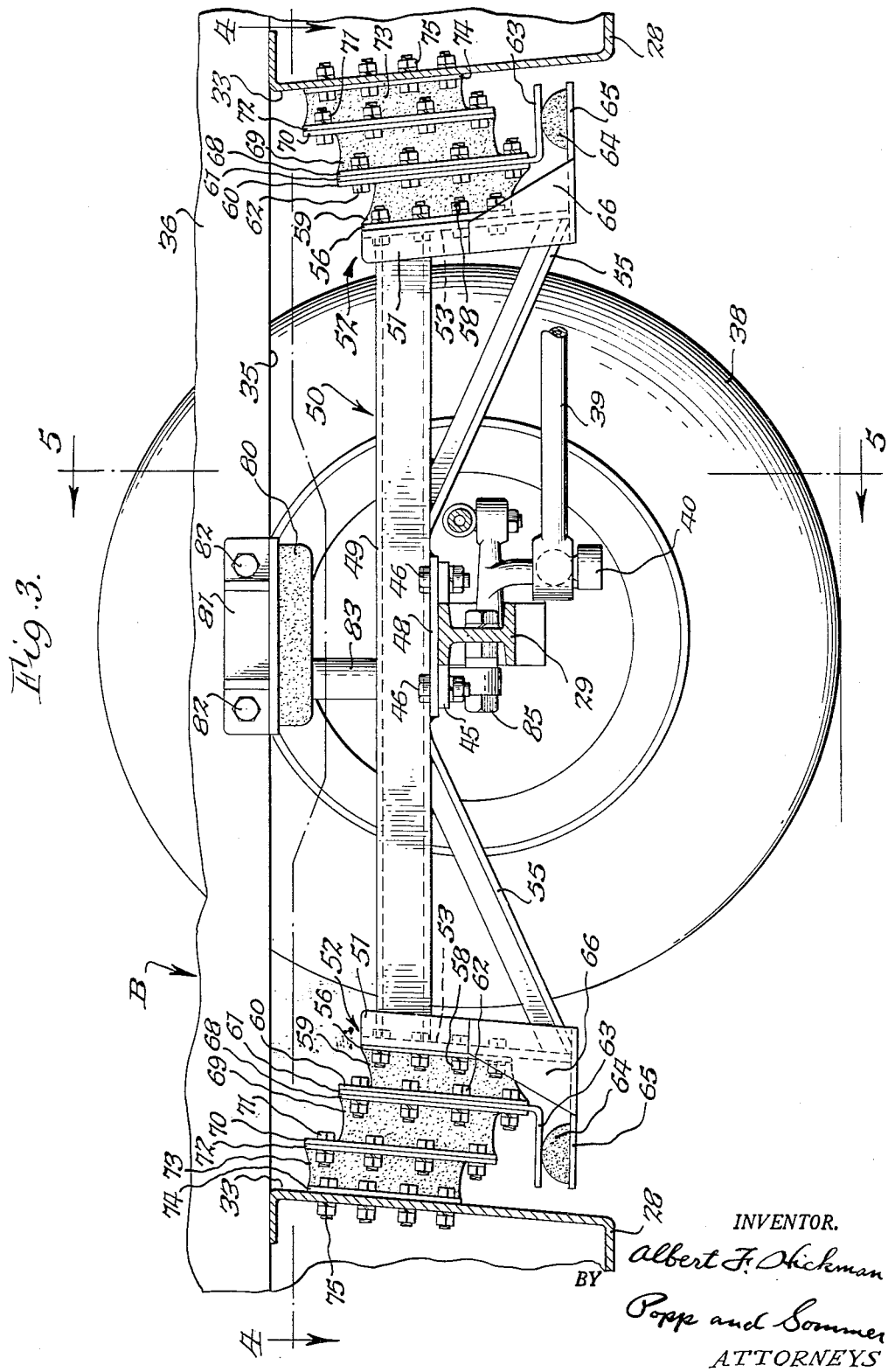

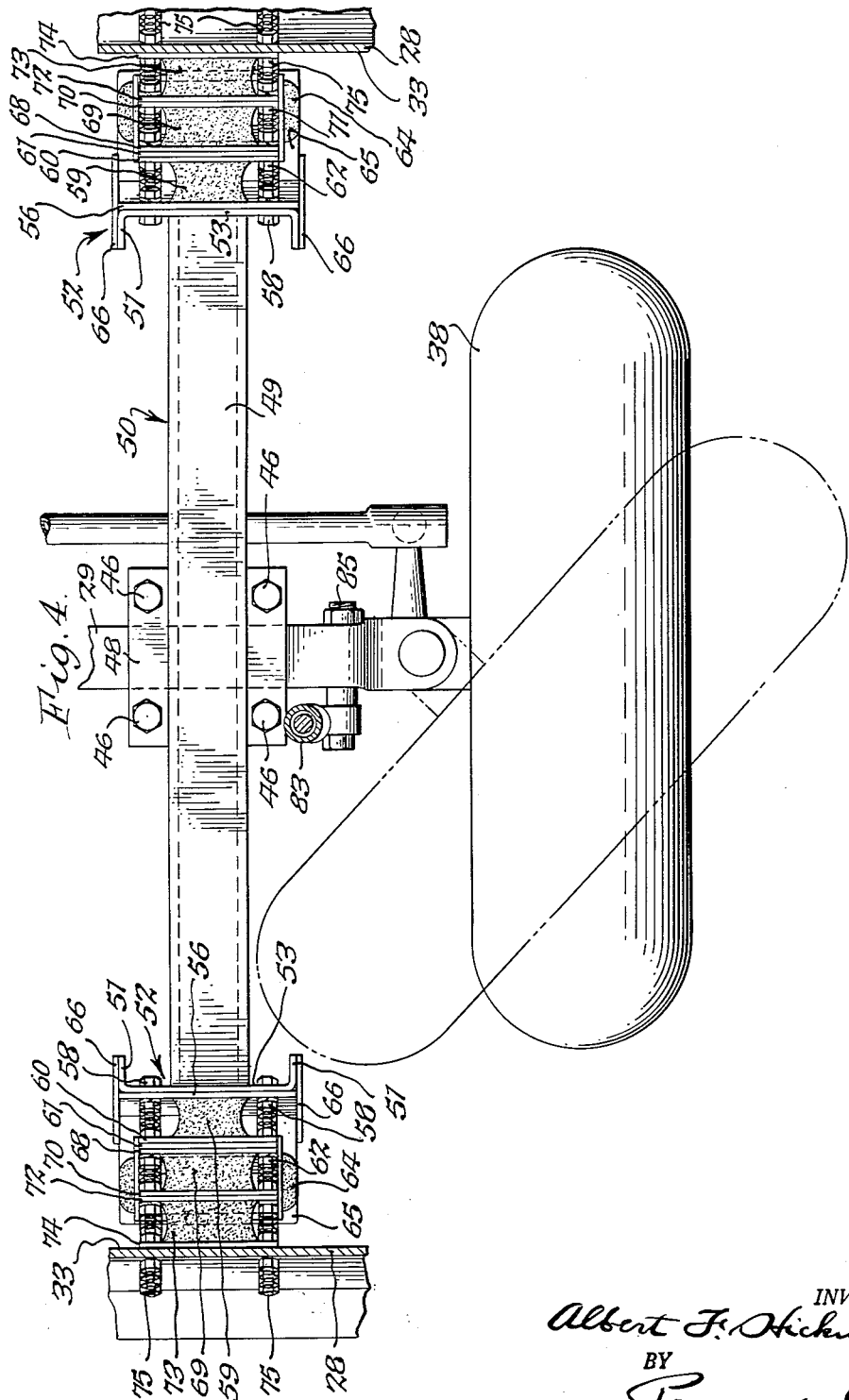

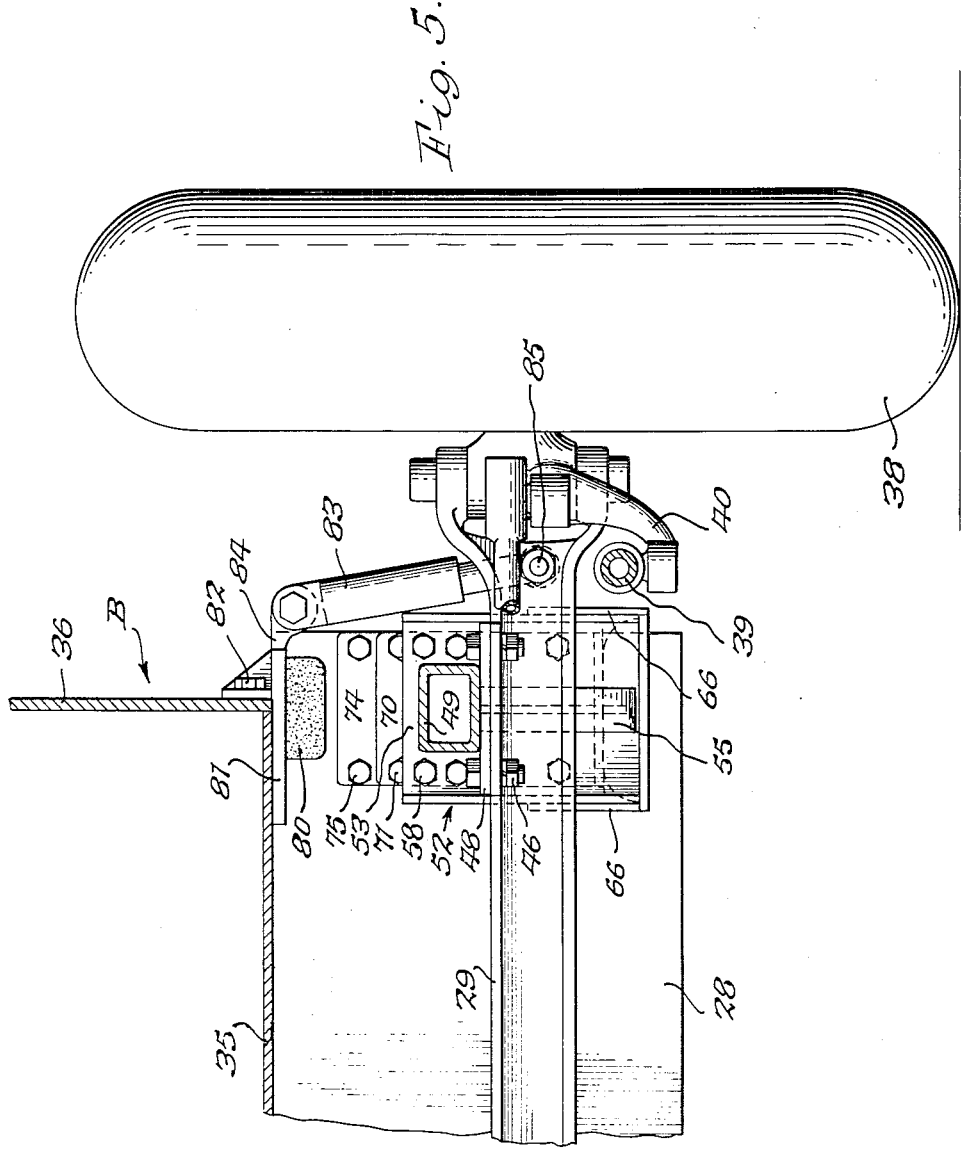

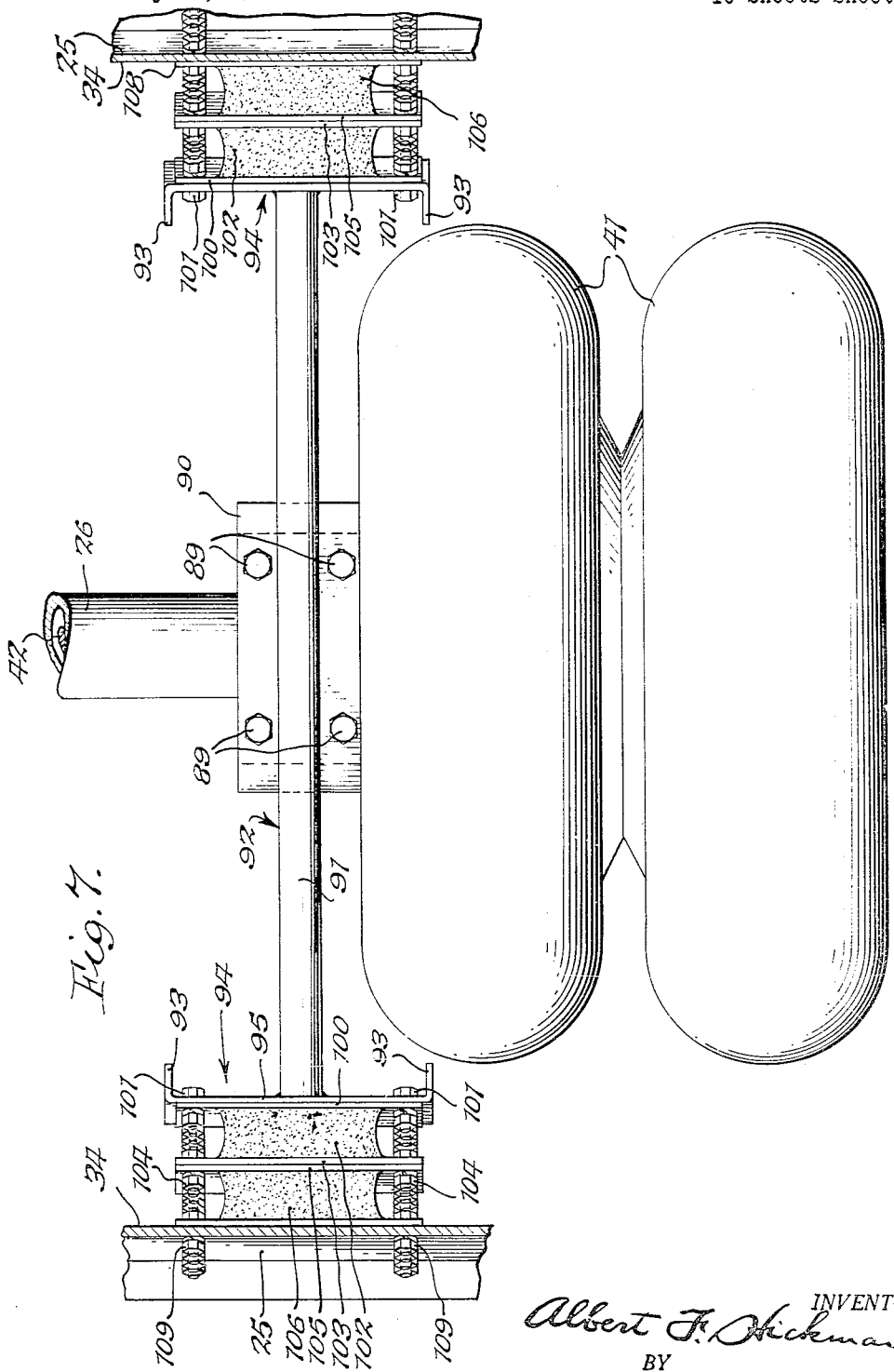

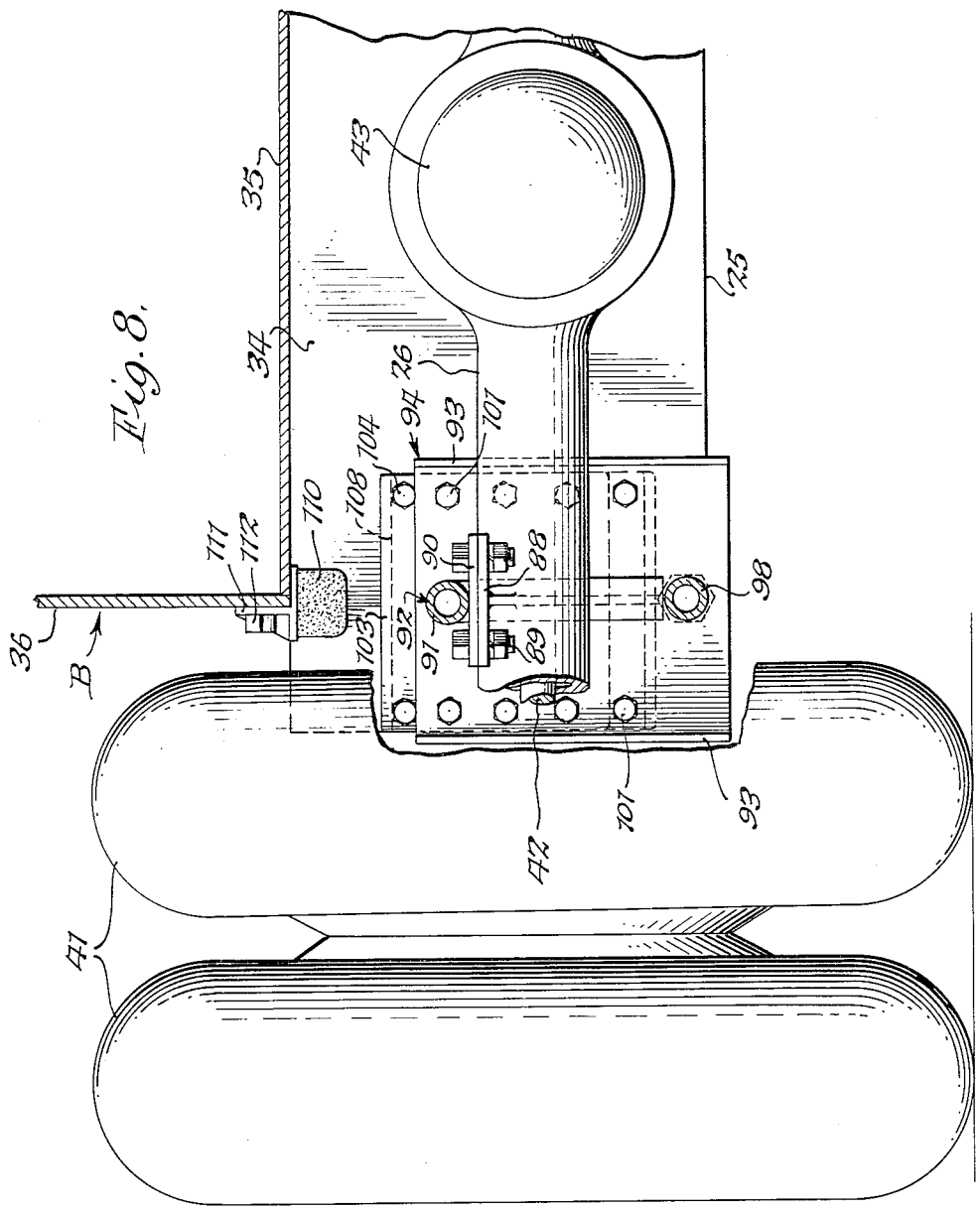

June 26, 1956  A. F. HICKMAN  2,752,166
VEHICLE SPRING SUSPENSION OF THE SHEAR RUBBER TYPE
Filed July 10, 1952  10 Sheets-Sheet 8
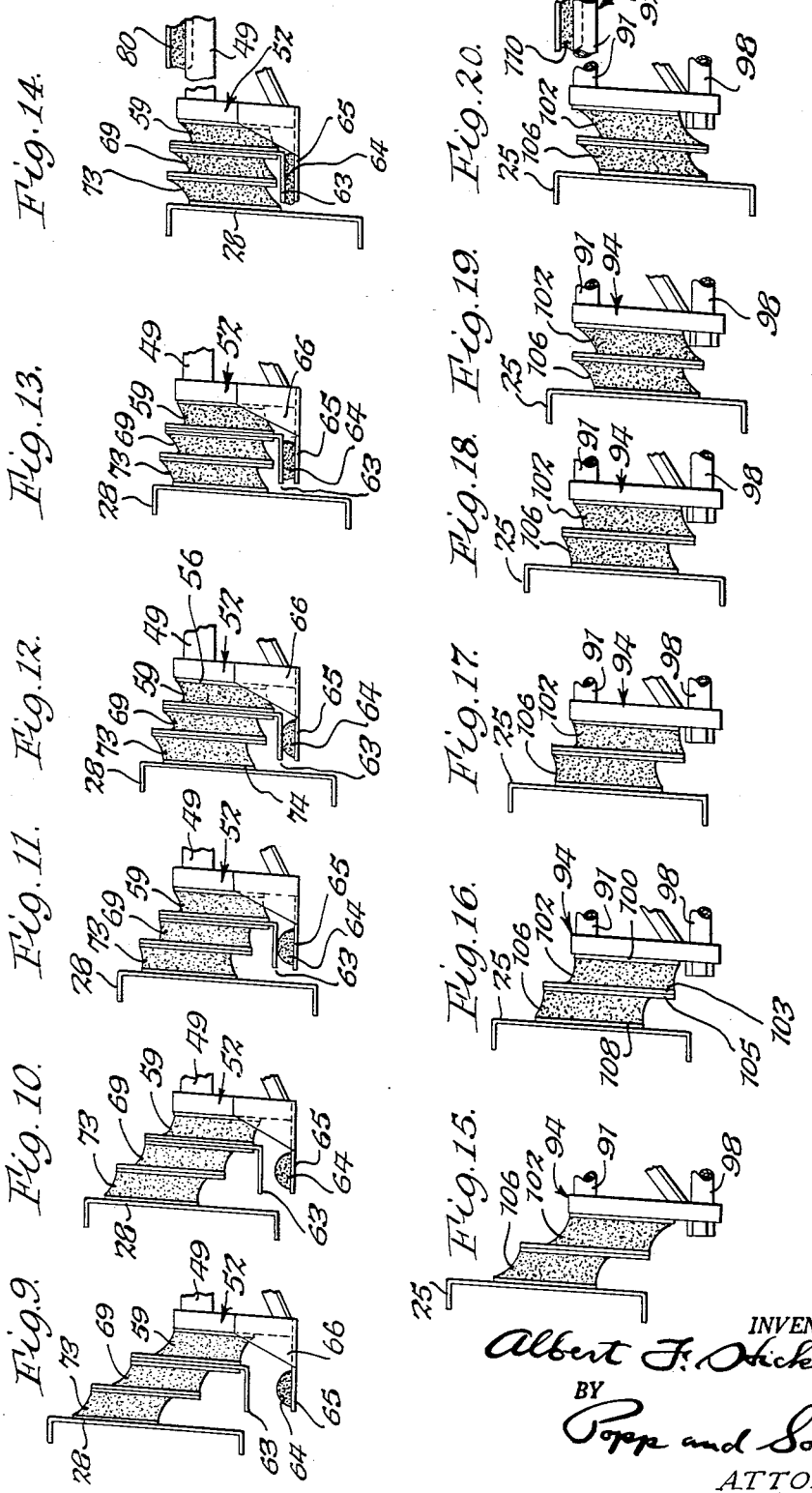
INVENTOR.
Albert F. Hickman
BY
Popp and Sommer
ATTORNEYS

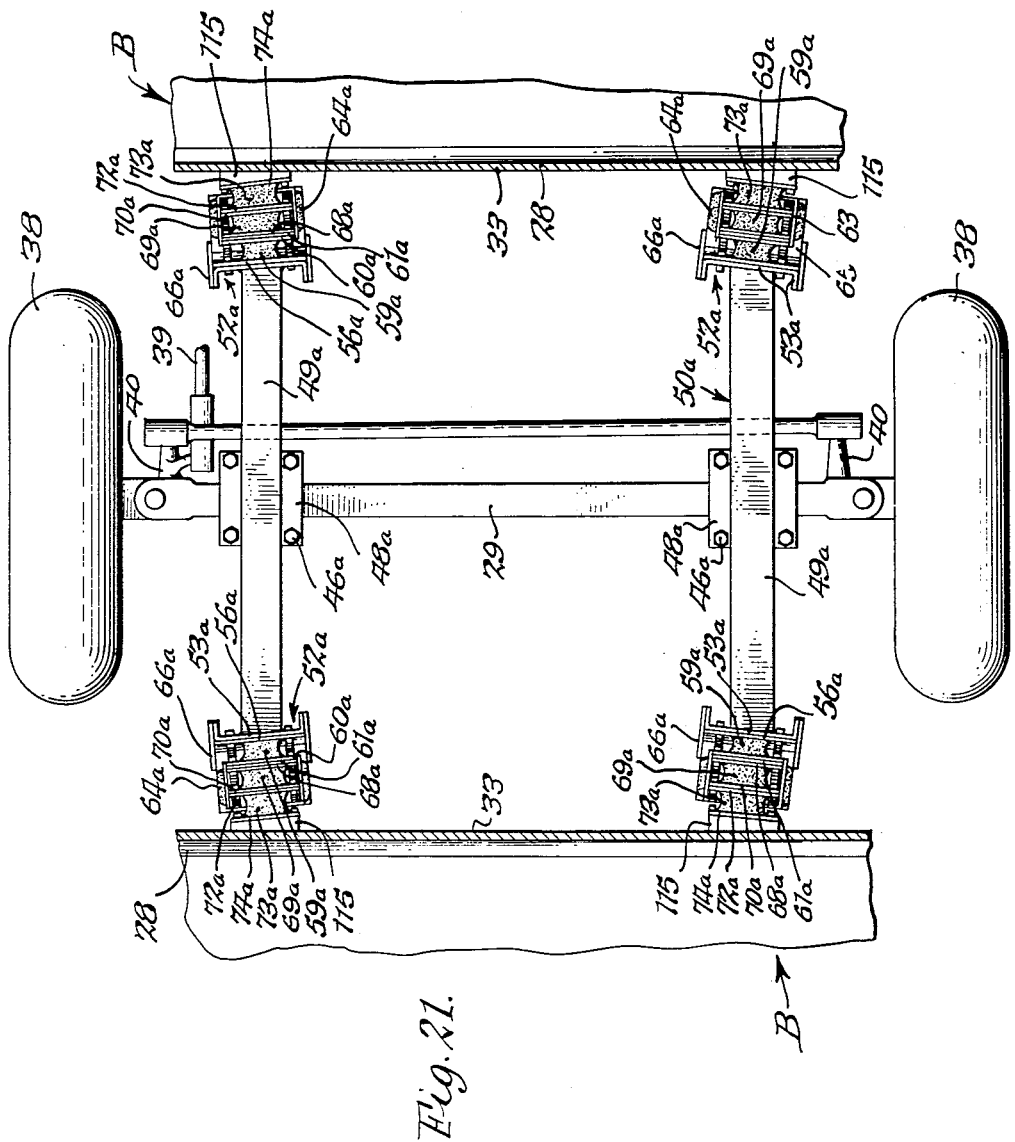

June 26, 1956  A. F. HICKMAN  2,752,166
VEHICLE SPRING SUSPENSION OF THE SHEAR RUBBER TYPE
Filed July 10, 1952  10 Sheets-Sheet 10
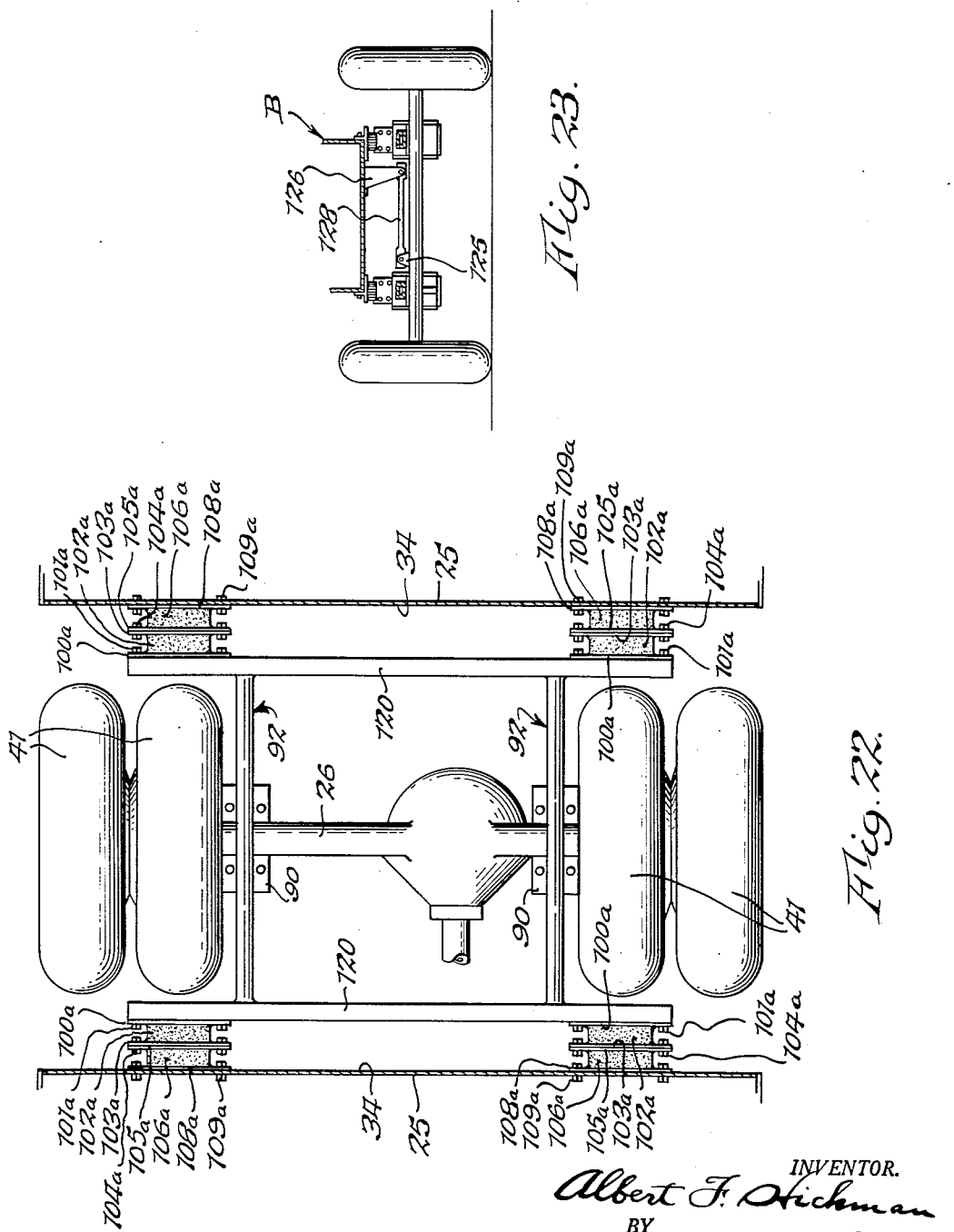

United States Patent Office 2,752,166
Patented June 26, 1956

2,752,166

VEHICLE SPRING SUSPENSION OF THE SHEAR RUBBER TYPE

Albert F. Hickman, Eden, N. Y., assignor to Hickman Developments, Inc., Eden, N. Y., a corporation of New York Application July 10, 1952, Serial No. 298,027

13 Claims. (Cl. 280—124)

This invention relates to a vehicle spring suspension and more particularly to a spring suspension for a so-called frameless bus, that is, a bus having no continuous longitudinal members to which the spring suspension is connected, although features of the invention, particularly the feature of the self-steering axle, can be embodied in spring suspensions for commercial trucks, tandem axles and pleasure cars.

The invention is particularly directed to a spring suspension of the shear rubber, rectilinear movement type as shown in my copending applications for spring suspensions, Serial No. 207,999, filed January 26, 1951, now Patent No. 2,706,113, dated April 12, 1955, and 213,194 filed February 28, 1951.

In common with my said copending applications an important object of the present invention is to provide a shear rubber, rectilinear movement type of suspension which will permit the large amount of vertical axle movement necessary with highway vehicles to provide a vertical ride as soft as load heights will allow and at a low frequency.

Another important object is to provide such a suspension which is free from friction but is automatically controlled by an increased resistance to motion in proportion to the amplitude and velocity of vertical frame and wheel movement relative to each other.

Another important object is to provide such a suspension in which lateral, vertical, angular, and a slight amount of longitudinal axle movements, with reference to the vehicle frame, are permitted and resiliently resisted thereby to provide increased safety, tire and gasoline mileage, and stability.

Also in common with my said copending applications, other important objects are the complete elimination of lubrication; and to provide such a suspension which will stand up for many years without servicing, repair or replacement; in which the frame is cradled and supported at well spaced points to reduce frame stress; which is very light in weight, particularly in unsprung weight; which is free from friction but can be automatically controlled by an increasing resistance to motion in proportion to amplitude and velocity of vertical frame and wheel movements; in which very little shock absorber control is required; which is compact; which provides a much wider spring base than with conventional leaf springs; which can be easily taken down and replaced; which is low in both initial cost and upkeep; which renders auxiliary devices for control of sidesway unnecessary; in which periodic vibration of the suspension is dampened out; which can be designed to have a long and variable spring resistance range; and in which the bond stress of the rubber blocks used is kept within safe working limits.

A specific object of the present invention is to provide such a suspension which is particularly applicable to a vehicle having no continuous longitudinal members to which the spring suspension is connected.

Another specific object is to provide such a suspension which is applicable to both the front and rear axles of such a vehicle.

Another specific object is to provide a simple non-metal-to-metal bottoming stop for axle movement.

Another important specific object of the present invention is to provide such a suspension in which the axle can be made self-steering, this is, the axle can be made so as to steer either to the right or to the left in response to lateral movement of the axle with reference to the frame. Such self-steering can be in the nature of oversteering or understeering as conditions may require.

Another specific object is to provide such a suspension in which the shock absorbers can be applied to resist both vertical axle movement and also, to any desired lesser degree, lateral axle movement.

Another specific object of the invention is to provide a simple method of eliminating lateral axle movement if this should be desired.

Other specific objects and advantages of the invention will be apparent from the following description and drawings in which:

Fig. 1 is a side elevation of a suspension for a frameless bus embodying the present invention, the axles and drive shaft being shown in a section taken along line 1—1, Fig. 2.

Fig. 2 is a fragmentary top plan view thereof.

Fig. 3 is a greatly enlarged fragmentary view similar to the right hand end of Fig. 1 and showing the front or steering axle suspension in greater detail and in side elevation.

Fig. 4 is a fragmentary horizontal section taken generally on line 4—4, Fig. 3.

Fig. 5 is a fragmentary vertical section taken generally on line 5—5, Fig. 3.

Fig. 6 is a greatly enlarged fragmentary view similar to the left hand end of Fig. 1 and showing the rear or drive axle suspension in greater detail and in side elevation.

Fig. 7 is a fragmentary horizontal section taken generally on line 7—7, Fig. 6.

Fig. 8 is a fragmentary vertical section taken generally on line 8—8, Fig. 6.

Figs. 9–14 are simplified or diagrammatic side elevational views of one of the groups of rubber shear springs supporting the front or steering axle (Figs. 1–5), Fig. 9 showing the condition of these rubber shear springs when they are completely unloaded, such as if the body were jacked up; Fig. 10 when the load of the empty body is applied; Fig. 11 when the seated live load is applied; Fig. 12 when the full standee load is applied; Fig. 13 when a heavy impact is received from the front axle; and Fig. 14 when the suspension is fully bottomed.

Figs. 15–20 are similar views of one of the groups of rubber shear springs supporting the rear or drive axle (Figs. 1 and 6–8), Fig. 15 showing the condition of the rubber shear springs when they are completely unloaded, such as if the body were jacked up; Fig. 16 when the load of the empty body is applied; Fig. 17 when the seated live load is applied; Fig. 18 when the full standee load is applied; Fig. 19 when a heavy impact is received by the rear drive axle; and Fig. 20 when the suspension is fully bottomed.

Fig. 21 is a fragmentary top plan view, similar to Fig. 4, of a modified form of suspension for the front or steering axle of the bus, this modification incorporating the feature of self-steering of this axle.

Fig. 22 is a view similar to Fig. 21 and showing a modified form of suspension for the rear or drive axle of the bus.

Fig. 23 is a vertical transverse section through a part of the body of a bus and showing in elevation a front steering axle and its suspension and illustrating a modification of the invention in which the front steering axle is held against lateral movement with reference to the body.

The invention is particularly illustrated as applied to a body of the so-called frameless type, such body having horizontal transverse bars 25 flanking the rear or driving axle 26, and having transverse bars 28 flanking the front steering axle 29, these transverse bars connecting at their ends with main longitudinal side frame bars 30, 31 and 32 which latter terminate at the spaces occupied by these axles, this type of body being principally used in connection with buses and being commonly known as a frameless body. It is a particular feature of the present invention that these transverse bars 25, 28 form abutment members for the shear rubber springs as hereinafter described and do not lie in a vertical plane but are canted, the pair of transverse bars 28, 28 at the front of the bus being canted to converge upwardly toward each other and thereby present opposed upwardly converging faces 33, and the pair of transverse bars 25, 25 at the rear of the body likewise being canted to converge upwardly toward each other and thereby present upwardly converging faces 34.

The pair of front transverse bars 28, 28 are connected by floor and side pieces 35, 36 (Fig. 5) of a body structure indicated generally at B and which body includes the bars 25, 28, 30, 31 and 32. Similarly the pair of rear transverse bars 25, 25 are connected by the floor and side pieces (Fig. 8) of the body B.

The front axle 29 is shown as supported by steering wheels 38 at its opposite ends. These steering wheels 38 can be turned by any form of steering gear so as to be movable about a vertical axis, as illustrated by the two positions shown in Fig. 2, for steering the wheel either to the right or to the left. The specific form of the steering gear is of no consequence so far as the present invention is concerned and the only part of this steering gear which is illustrated is the conventional steering drag link 39, the rear end of which is connected with the usual actuating arm 40 of the stub shaft for the wheel, and the front end of which is connected to the lower end of the usual actuating arm (not shown) which is pivoted on the frame for fore-and-aft movement.

The rear or drive axle 26 is shown as supported at its opposite ends on dual driving wheels 41 fast to the usual pair of drive shafts 42 connected by the usual differential contained in a differential housing 43 forming part of the drive axle 26.

The entire vehicle body, axles and suspension between the body and axles is constructed substantially symmetrically about a vertical longitudinal medial plane, and hence it is deemed sufficient to confine the following detailed description to the one (left) side of the vehicle, it being understood that this description and the same reference numerals apply to the opposite (right) side of the vehicle.

Front or steering axle suspension (Figs. 1–5)

Referring more particularly to the suspension supporting the front end of the body on the front or steering axle 29 and illustrated in Figs. 1–5, the numeral 45 represents two lateral, opposite extensions of the upper flange of the axle 29 at each end thereof to form an axle bracket which forms a horizontal base extending lengthwise of the vehicle body B. To the base surface provided by each axle bracket 45 is removably secured, as by bolts 46, a plate 48 to which is welded the main horizontal bar 49 of a truss or bar structure indicated generally at 50.

This truss or bar structure extends transversely of the axle 29 and each end of the main bar 49 projects between the vertical flanges 51 of an upright shear spring abutment member in the form of a metal channel 52 and is welded to the upper part of the back or web 53 of this channel. Each of these upright channels is arranged in opposed relation to the face 33 of the corresponding canted transverse bar 28 of the body. The two companion upright channels 52 are secured to the main bar 49 of the truss so that these channels converge upwardly each in parallel relation to the opposing face 33 of the adjacent transverse bar 28 of the body B as best shown in Fig. 3. These upright channels 52 project downwardly well below a horizontal plane intersecting the axis of the front or steering axle 29 and the lower end of each of these channels is reinforced by a diagonal brace 55, preferably T-shaped in cross section, and welded at its lower end to the lower part of the back or web 53 of the corresponding channel 52 and at its upper end to the underside of the main bar 49 of the truss near the ends of the supporting plate 48 thereof.

A vertical elongated rectangular metal plate 56 is secured, as by two vertical series of side bolts 58, to the external face of the back or web 53 of each channel 52, these plates 56 thereby converging upwardly with reference to each other. To the face of each of these rectangular plates 56 opposite from the corresponding channel 52 is vulcanized a shear rubber block or body 59, these shear rubber bodies or blocks being characterized by being of relatively small effective size, that is in a direction parallel with the plate 56, as compared with other shear rubber blocks or bodies arranged in tandem with the rubber blocks 59 as hereinafter described. The vertical face of each rubber body or block 59 opposite the rectangular plate 56 is vulcanized to a vertically elongated intermediate rectangular plate 60.

A rectangular metal intermediate or stop plate 61 is secured, as by two vertical series of side bolts 62, to the face of each metal plate 60 opposite its rubber body 59. The lower end of this intermediate or stop plate 61 is formed to provide a horizontal flange 63. A feature of the invention resides in the projection of each flange 63 away from the adjacent upright channel 52.

The bottom of each stop flange 63 engages a rubber bumper 64 suitably secured to the upper face of a stop flange or seat 65 on the axle structure or truss 50. Preferably this stop flange or seat 65 is in the form of a horizontal plate welded to the lower end of the corresponding channel 52 and reinforced by triangular side plates 66.

The two vertical series of side bolts 62 securing each intermediate or stop plate 61 to the adjacent rectangular metal plate 60 also secure to the stop plate 61 another rectangular metal plate 68. To the face of this rectangular metal plate 68 opposite the intermediate or stop plate 61 is vulcanized a shear rubber block or body 69 and to the vertical side of this shear rubber body 69 is vulcanized another rectangular plate 70.

This last rectangular plate 70 is secured, as by two vertical series of side bolts 71, to another rectangular plate 72 to the opposite face of which is vulcanized an end shear rubber body or block 73. To the face of each shear rubber body or block 73 opposite the intermediate rectangular metal plate 72 is vulcanized an end rectangular metal plate 74 and this end plate is secured as by two vertical series of side bolts 75, to the opposing face 33 of the transverse bar 28 of the body B.

The plates 56, 60, 61, 68, 70, 72 and 74 at each end of the truss 50 are parallel with the face 33 of the adjacent transverse bar 28 and with the back or web 53 of the adjacent upright channel 52, this providing a wedging action of the upwardly converging shear rubber bodies 59, 69 and 73 at opposite ends of each truss. Also, as previously indicated, each of the shear rubber bodies 59 is of smaller effective cross sectional area, that is, in a direction parallel with the rectangular plates 56 and 60 to which it is bonded, than the effective cross sectional area of the shear rubber bodies 69 and 73, these latter being shown as being equal in effective cross sectional area.

A rubber bumper 80 of any suitable form is secured to an L-shaped bracket 81 which is in turn secured, as by bolts 82, to embrace the exterior corner provided by the bottom and side pieces 35, 36 of the body B. This bumper 80 and its bracket are arranged directly above the main bar 49 of the truss 50, and hence it will be seen that this main bar 49 of the truss engages this rubber bumper under extreme shock conditions so that this rubber bumper provides a cushioned bottoming stop for the front suspension and prevents metal-to-metal contact on bottoming.

Also for control of the suspension, it is desirable, although not necessary, to provide shock absorbers, indicated at 83, Figs. 2, 3, 4, and 5. These shock absorbers are preferably of the telescopic type and are arranged to have their upper ends pivotally secured to an ear 84 projecting from each bracket 81 for the rubber bumper 80. These shock absorbers at opposite ends of the axle 29 are preferably arranged to diverge downwardly and outwardly with their lower ends secured to horizontal bolts 85 extending transversely through each end of the front axle 29. It will be seen that by this arrangement of the shock absorbers 83 they provide control of the lateral movement of the axle 29 with respect to the body as well as of the vertical movement thereof with reference to the body.

*Rear or drive axle suspension (Figs. 1, 2, 6, 7, 8)*

Referring more particularly to the suspension supporting the rear end of the body B on the rear or drive axle 26 and illustrated in Figs. 1, 2, 6, 7 and 8, the numeral 88 represents a pair of axle brackets which are secured to each end of the axle 26 in any suitable manner and which form a horizontal base extending lengthwise of the body B. Each pair of these axle brackets is preferably arranged directly under the corner formed by the floor and side pieces of the body B (see Fig. 8). To each pair of these axle brackets is removably secured, as by bolts 89, a plate 90 and to which is welded the upper horizontal tube 91 of a truss or bar structure indicated generally at 92.

This truss extends transversely of the axle and each end of the upper tube 91 projects between the flanges 93 of a shear spring abutment member in the form of an upright metal channel 94 and is welded to the upper part of the back or web 95 of this channel as indicated in Fig. 6. Each of these upright channels is arranged in opposed relation to the face 34 of the corresponding transverse bar 25 of the body B. The two upright channels 94 are secured to the upright horizontal tube 91 of the truss so that these channel members converge upwardly each in parallel relation to the opposing face 34 of the adjacent transverse bar 25 of the body as best shown in Fig. 6. These upright channels 94 project downwardly well below a horizontal plane intersecting the axis of the rear or driving axle 26 and the lower end of each of these channels is reinforced by a diagonal brace 96, preferably T-shaped in cross section, and welded at its lower end to the lower part of the back or web 95 of the corresponding channel and at its upper end to the underside of the upper tube 91 of the truss near the ends of the supporting plate 90 thereof.

The truss is completed by a lower horizontal spacer tube 98 which is interposed between the lower ends of the webs or backs 95 of the upright channels 94 of each truss and extends below the axle 26 in parallel relation to the upper tube 91 of the truss. In order to permit removal of the axle 26 from the body B, this lower horizontal spacer tube 98 is removable from the truss and for this purpose a screw 99 extends through the lower end of each upright channel 94 and into the internally threaded end of the spacer tube 98. It will be seen that by removing the screws 99 the spacer tube 98 can be removed and the axle 26 and rear axle suspension assembly can be readily removed from the jacked up body.

A vertically elongated metal plate 100 is secured, as by two vertical series of side bolts 101, to the external face of the back or web 95 of each channel 94, these plates thereby converging upwardly with reference to each other. To the face of each of these rectangular plates 100 opposite from the corresponding channel 94 is vulcanized a shear rubber block or body 102. The vertical face of each shear rubber body or block 102 opposite the rectangular plate 100 is vulcanized to a vertically elongated intermediate rectangular metal plate 103.

To this last rectangular plate 103 is secured, as by two vertical series of side bolts 104, another vertically elongated rectangular plate 105. To the face of this rectangular metal plate 105 opposite the shear rubber body 102 is vulcanized a shear rubber block or body 106 and to the opposite vertical side of this rubber body 106 is vulcanized an end rectangular metal plate 108. This end plate 108 is secured, as by two vertical series of side bolts 109, to the opposing face 34 of the transverse bar 25 of the body.

The plates 100, 103, 105 and 108 at each end of the truss 92 are parallel with the face 34 of the adjacent transverse bar 25 and with the back or web 95 of the adjacent upright channel 94, this providing a wedging action of the upwardly converging shear rubber bodies 102 and 106 at opposite ends of each truss.

A rubber bumper 110 of any suitable form is secured to an L-shaped bracket 111 which is in turn secured, as by bolts 112, to embrace the exterior corner provided by the bottom and side pieces 35, 36 of the body B. This bumper 110 and its bracket 111 are arranged directly above the upper tube 91 of the truss 92, and it will be seen that this upper tube of the truss engages this rubber bumper under extreme shock conditions so that this rubber bumper provides a cushioned bottoming stop for the rear suspension and prevents metal-to-metal contact on bottoming.

*Operation (Figs. 1–20)*

In the operation of the front suspension between the steering wheels and the body (Figs. 1–5), the free spring condition of the suspension, that is, when there is no downward pressure upon the shear rubber bodies 59, 69 and 73, such as if the body B were jacked up, is illustrated in Fig. 9.

When the load of the empty body B is impressed upon the suspension, the weight of this empty body, through the transverse bars 23, 28, impresses a downward force on each of the pair of large or heavy shear rubber bodies 73 so as to distort them to the condition shown in Fig. 10. This pressure is transmitted through the plates 72 and 70 to the pairs of large or heavy shear rubber bodies 69. This pressure is transmitted through the plates 68 and 60 and their intermediate or stop plates 61 to the pairs of small or light rubber bodies 59, and since these last rubber bodies 59 have a much smaller effective cross sectional area than the large or heavy shear rubber bodies 69 and 73 they are distorted to a much greater degree as illustrated in Fig. 10. The downward pressure is transmitted by these small or light rubber bodies 59, through their plates 56 to the channels 52 secured to the main bar 49 and the angular braces 55 and which form the truss 50. This truss is secured to the axle bracket 45 and hence this force is transmitted to the front steering axle 29. In this condition of the shear rubber springs, the preponderance of the resiliency is provided by the light or soft shear rubber springs 59 since they are of smaller effective cross sectional area than the large or heavy shear rubber springs 69 and 73. Accordingly the empty or lightly laden bus has a soft ride on the light or soft shear rubber springs 59.

When the seats of the bus are fully occupied further downward pressure is impressed upon the large or heavy shear rubber bodies 73 and 69 and these shear rubber bodies are brought to the position shown in Fig. 11. In this position of the parts, the stop flange 63 of the intermediate or stop plate 61 of each group of shear rubber springs is brought into engagement with the rubber bumper 64 on the flange 65 projecting from the corresponding end of the truss 50. This rubber bumper 64 resists further relative vertical movement of the plates 60 and 56 and since the lighter shear rubber bodies 59 are interposed between these plates, it will be seen that these small or light rubber bodies 59 are stressed close to their maximum extent.

When the bus has an additional full standee load each group of rubber springs is distorted to the position shown in Fig. 12. In this condition the large or heavy shear rubber bodies 73, 69 are distorted downwardly to a further degree, but the distortion of the relatively light or soft shear rubber bodies 59 is only to the extent that the rubber bumper 64 compresses. It will accordingly be seen that substantially all of the resilient resistance, with greater than fully seated loads, is provided essentially by the large or heavy shear rubber bodies 73 and 69 and that the relatively light or soft shear rubber bodies 59 are substantially cut out of service and prevented from being overloaded.

With a heavier than full standee load, such as when a loaded bus is subjected to severe road impacts, the large or heavy shear rubber bodies 73, 69 are distorted downwardly still further as illustrated in Fig. 13. Under such heavy loads there is substantially no effective distortion of the relatively light or soft shear rubber bodies 59, the additional distortion of these relatively light rubber bodies being only such as the further compression of the rubber bumpers permits.

Under heavy loads and extreme impacts the suspension bottoms, there occurring still further compression of the large or heavy shear rubber bodies 73 and 69 and there being no substantial further distortion of the soft or light shear rubber bodies 59. A further compression of the rubber bumpers 64 takes place as illustrated in Fig. 14, and also the main bar 49 of the truss 50 bottoms against its bottoming bumper 80.

Substantially the same action takes place in the suspension for the rear end of the vehicle on the drive axle 26 except that at the rear of the vehicle no relatively soft or light shear rubber springs are provided nor is a stop provided to prevent overstressing of such relatively light shear rubber springs.

Thus the free spring condition of the suspension, that is, when there is no downward pressure even of the empty body B upon the shear rubber bodies 106 and 102 is illustrated in Fig. 15.

When the load of the empty body B is impressed upon the suspension, the weight of this empty body, through the transverse bars 25, 25 of the body, impresses a downward force on each pair of shear rubber bodies 106 so as to distort them to the condition shown in Fig. 16. This pressure is transmitted through the plates 105, 103 to the pairs of shear rubber bodies 102. The downward pressure is transmitted by these pairs of shear rubber bodies 102 through their plates 100 to the channels 94 secured to the ends of the upper and lower rods 91 and 93 of each truss 92. Each of the upper rods 91 is supported on an axle bracket 83 and since these axle brackets are fast to the axle 26, this force is transmitted through this axle to the drive wheels 41.

When the bus has a seated load further downward pressure is impressed upon the shear rubber bodies 106, 102 and these shear rubber bodies are brought to the position shown in Fig. 17. When the bus carries a full standee load, these shear rubber bodies 106, 102 are distorted to the position shown in Fig. 18. When the bus is heavily loaded and subjected to heavy impacts, these shear rubber bodies are distorted to the condition shown in Fig. 19 and when extreme shock loads of sufficient value to cause the suspension to bottom are encountered these rubber bodies 106, 102 are distorted to the position shown in Fig. 20. In this bottoming of the suspension the upper bar 91 of each truss 92 engages and compresses the bottoming bumper 110 on the body B and hence overstressing of the shear rubber springs 106, 102 is prevented and at the same time the bottoming forces are cushioned and metal-to-metal contacts on bottoming is avoided.

At the front of the bus, since each pair of shear rubber bodies 59 is of much smaller effective cross sectional area than the companion larger or heavy shear rubber bodies 73, 69 these pairs of light shear rubber bodies 59 flex under light load conditions and under light impacts to provide the desired ride when the bus is traveling empty or lightly loaded. The amplitude of axle movement permitted by these light shear rubber bodies 59 under light load conditions provides a low spring frequency at the front end of a bus when empty or lightly loaded.

When the bus is loaded beyond maximum seated capacity, however, these light shear rubber bodies 59 are prevented from being overstressed and are cut out of service by engagement of the stop flanges 63 with the rubber bumpers 64 which resiliently resist further substantial downward movement of the plate 60 relative to the plate 56 and hence the amount of force which can be impressed on these relatively light shear rubber bodies 59 and the degree of distortion and bond stress thereof. Accordingly, when the bus is fully loaded or subjected to heavy or extreme downward forces, these downward forces or impacts are principally yieldingly resisted by the large or heavy shear rubber bodies 73, 69 and under such conditions these shear rubber bodies 73, 69 provide a low ride frequency for the heavy laden bus.

It will be seen that each corner of the body B is supported by groups of shear rubber bodies with the shear rubber bodies arranged in series or tandem and that each of these shear rubber bodies has a rectilinear shear movement. It will be seen that by arranging the shear rubber bodies in tandem each series provides the large amount of vertical axle movement necessary with highway vehicles to provide a vertical ride as soft as load heights will allow and at a low frequency.

A further feature of the invention is that all of the shear rubber blocks or bodies permit laterally cushioned movement of both the front axle 29 and the rear axle 26 relative to the body B. Since these rubber bodies are shear springs and since they are arranged with their shear planes generally parallel with the axes of the front and rear axles, it will be seen that the movement of either axle in the direction of its axis, or laterally of the body, is permitted and resiliently resisted by the shear rubber bodies. In this action either axle and its trusses move laterally relative to the body and relative to the transverse body bars 25, 28 and the shear rubber bodies distort horizontally to permit and yieldingly resist such movement. It will be noted that when the truck is lightly loaded most of the resilient resistance to such lateral movement of the front or steering axle 29 relative to the front of the body B is provided by the lighter rubber bodies 59 so that under such circumstances a low frequency laterally cushioned movement is permitted.

When the rubber bumper 64 is engaged by the stop flange 63 following maximum seated load, the preponderance of lateral cushioning of the movement of the front or steering axle 29 relative to the front of the body B is provided by the heavy shear rubber bodies 73, 69.

Angular movement of either axle, such as when one wheel rises relative to the opposite wheel, is also resiliently resisted by the shear rubber bodies at both ends of the body. Thus the vertical component of such angular axle movement is resisted in the same manner as previously described for vertical axle movement and the horizontal component of such angular axle movement is resisted in the same manner as previously described for lateral axle movement.

The shear rubber bodies also permit a limited movement of either axle longitudinally of the body B. While these rubber bodies are essentially shear springs acting in a vertical plane generally parallel with the axles, the desired axle movement lengthwise of the body B is very small, in the order of a small fraction of an inch. Such small resiliently permitted movement is essential, however, as against sledge hammer blows of either axle lengthwise of the body and to provide some degree of flexibility in all directions. Such small movement is permitted and resiliently resisted by the shear rubber springs which compress transversely to a small degree.

Since all of the shear rubber bodies are interposed between the upwardly converging faces 33, 34 of the pairs of transverse body bars 25 and 28 at the front and rear ends of the body, respectively, it will be seen that upward movement of either axle achieves a wedging action on these shear rubber blocks or bodies. This wedging action increases as the load increases. This wedging action greatly increases the load capacity of the shear rubber bodies insofar as their bonding to their rectangular metal plates is concerned.

This wedging action also eliminates the need and cost of an adjusting mechanism between the shear rubber bodies at the opposite ends of either of the trusses 50 and 92. It also simplifies the mounting problems by elimination of such adjustment and improves the resistance curves of the springs. Thus the resistance is more nearly constant at the start of deflection and increases, through wedging compression of the shear rubber bodies, as the deflection increases.

Lubrication requirements are entirely eliminated in the suspension and the suspension is designed to stand up under conditions of severe and constant use, regardless of atmospheric, climatic, road or type of load conditions at least five years without service. Salt, road dust and weather conditions will not substantially affect the action of the suspension. Oil will slightly affect the shear rubber springs, if made of natural rubber, but only the extreme outer portions thereof and will not go deep enough to cause any substantial damage within the five year period.

The spring suspension is also very light in weight as compared with conventional spring suspensions, particularly in unsprung weight. It costs power and loss of load capacity to carry unnecessary weight and it costs at least double in power to carry unnecessary unsprung weight.

By making the trusses 50 and 92 as long as shown, that is, greater than the diameter of the wheels and tires, all brake and drive torque reactions are absorbed by the suspension without the use of radius rods or other auxiliary devices. This is an important feature in reducing cost, weight and the necessity of servicing.

At the front end of the bus it is desirable to have shock absorbers to take care of vertical axle movement and it is desirable that the shock absorbers also be effective to a limited degree so far as lateral axle movement is concerned. To this end shock absorbers 33 of telescopic type as illustrated in Figs. 2–5 can be employed and arranged at an angle to the vertical with the shock absorbers connected to the ends of the axles and inclining upwardly and inwardly. It will be seen that by arranging these shock absorbers at a slight angle to the vertical they essentially resist vertical axle movement but to a limited degree they also cushion lateral axle movement.

As previously indicated, the disposition of each flange 63, which engages the rubber bumper 64 to prevent overstressing of the light or soft shear rubber bodies 59 at the front of the bus is an important feature of the suspension. It will be noted that these flanges project away from the light rubber shear bodies 59 and are arranged at the bottom of these rubber shear bodies. As a consequence the back pressure of each rubber bumper 64 tends to rotate the plates 61 and 60 clockwise as viewed at the left of Fig. 3 or toward the light shear rubber bodies 59. With this movement of the plates 60 toward these light shear rubber bodies, these forces tend to augment the vulcanized bonds between the light shear rubber bodies 59 and their plates 60 and 56 rather than to apply a pulling or rupturing stress on these vulcanized bonds especially in the upper positions of the rubber bodies 59. Maintainance of the vulcanization bonds is, of course, essential to the operation of the suspension, this maintainance also being a feature of the wedging action on all of the rubber bodies as a load is placed thereon.

*Figure 21*

In Fig. 21 is illustrated a modification of the invention in which the front or steering axle 29 is also mounted so as to be self-steering. While illustrated in conjunction with a single axle, the features whereby self-steering is obtained is particularly applicable also to tandem axle suspensions, as described in detail in my copending application Serial No. 298,026 filed July 10, 1952, for Tandem Axle Vehicle Suspension. Self-steering involves translating a lateral movement of an axle, relative to the frame or body, into a forward movement of one end of the axle and a rearward movement of the other end of the axle so that the wheels of the axle are steered to the right or to the left in response to lateral movement of the body, as in rounding a curve or as caused by wind pressure. Under some conditions understeering is desirable, that is, it is desirable to have the self-steering work in opposition to normal steering in steering around a curve and where the body moves, relative to the axles, toward the outside of the curve. Under other conditions oversteering is desirable, that is, to have the self-steering add to normal steering. The modification shown in Fig. 21 can be employed to obtain either oversteering or understeering by arrangement of the shear rubber bodies at a corresponding angle.

In the modified form of the invention shown in Fig. 21, the body B, steering axle 29 with its wheels and steering gear, are the same as shown in Figs. 1–5 and hence the same reference numerals have been applied. The truss and its mounting on each end of the axle 29 and the tandem rubber shear springs at the ends of this truss are also similar to the showing in Figs. 1–5 and hence the same reference numerals have been applied and distinguished by the suffix "a." The same description of the operation also applies and hence will not be repeated.

However, it will particularly be noted that the shear spring abutment members or channels 52a are not perpendicular to the truss bar 49a in a horizontal direction, as with the form of the invention shown in Figs. 1–5 (see Fig. 4), but are arranged at a slight angle. In a horizontal direction these channels 52a at each end of one truss bar 49a are parallel and in a vertical direction they preferably incline upwardly and inwardly so as to converge upwardly and effect wedging of the rubber bodies 59a, 69a and 73a as an increasing load is impressed thereon. While the channels 52a at each end of one truss bar 49a are parallel in a horizontal direction, they are angularly disposed with reference to the axle 29 and these channels 52a at opposite sides of the vehicle incline, horizontally, in opposite directions so that these channels 52a toe out toward one end of the vehicle. If oversteering is desired, these channels 52a toe out toward the front of the vehicle and if understeering is desired these channels toe in toward the front of the vehicle. The several plates 56a, 60a, 61a, 68a, 70a 72a and 74a, as well as the shear rubber bodies 59a, 69a and 73a, are each arranged parallel with the back or web 53a of the companion channel 52 and hence each of these plates and shear rubber bodies also toe out toward one end of the vehicle. In a horizontal direction each end plate 74a is, of course, angularly disposed with reference to the face 33 of the body cross bar 28 and hence in order to fix these parts together an angular abutment or filler block 115 is interposed between each end plate 74a and the face 33 of the corresponding cross bar 28 and is fixed to each.

The angular or toeing out position of the shear rubber bodies 59a, 69a and 73a, together with their plates 56a, 60a, 61a, 68a, 70a and 72a as shown in Fig. 21 impart the most important feature of self-steering, either oversteering or understeering, to the axle 29 and its wheels 38.

Assuming that oversteering is desired and that these shear rubber bodies and their plates toe out toward the front of the vehicle, when the vehicle makes a turn in the road, the tires 38 tend to resist scuffing and in doing so push the axle 29 laterally to eliminate this scuffing. Viewed from the action of the body B, the centrifugal action against the body moves the body laterally with reference to the axle 29. This lateral movement of the body B with reference to the axle 29 displaces the shear rubber bodies 59a, 69a and 73a horizontally, these shear rubber bodies at one side of the vehicle being displaced toward the body and at the other side of the vehicle being displaced away from the body. Since these shear rubber bodies are held between plates set at an angle in a horizontal direction and since these plate at opposite sides of the vehicle are set at opposite angles in a horizontal direction so that all of these plates toe out toward the front of the vehicle, it will be seen that such lateral movement, with reference to the body, of the axle 29 causes one of its ends to be displaced forwardly and its other end to be displaced rearwardly.

It will therefore be seen that such endwise displacement of the axle 29 will cause a corresponding opposite displacement, fore-and-aft of the body B, of the opposite ends thereof, said fore-and-aft displacement steering the wheels 38 in a corresponding direction. By arranging the shear rubber bodies and their plates to toe out toward the front of the vehicle, as assumed, so-called oversteering is obtained in which the automatic steering is added to the normal steering. By arranging the shear rubber bodies and their plates to toe in toward the front of the vehicle so-called understeering is obtained in which the automatic steering is subtracted from the normal steering.

Figure 22

In Fig. 22 is illustrated an alternative suspension for supporting the rear end of the body B on the rear or drive axle 26. The drive axle 26 supported on its dual wheels and carrying a truss or bar structure 92 are shown as identical to the corresponding parts in the form of the invention shown in Figs. 1 and 6–9 and hence the same reference numerals have been applied and the description is not repeated. Instead, however, of each end of each truss 92 being connected to an individual channel, such as each channel 94 as in Figs. 1 and 6–9, the opposite ends of the trusses 92 in Fig. 22 connect with a pair of transverse channel bars 120 which extend transversely of the body B and connect the ends of the trusses at opposite ends of the drive axle 26.

Each end of each transverse channel bar 120 is connected to the opposing faces 34 of the body cross bars 25 by tandem shear rubber springs generally similar to the shear rubber springs of the form of rear end suspension shown in Figs. 1 and 6–9 and hence the same reference numerals have been employed and distinguished by the suffix "a." Thus to each end of each transverse channel bar 120 and on the face thereof opposing the body cross bar 25 is secured, as by bolts 101a, a rectangular plate 100a. To the opposite face of this rectangular plate 100a is vulcanized a shear rubber body 102a. To the opposite vertical face of this shear rubber body 102a is vulcanized a rectangular plate 103a. To the face of the rectangular plate 103a opposite the shear rubber body 102a is secured, as by bolts 104a, another rectangular plate 105a vulcanized to a second shear rubber body 106a. The opposite face of this shear rubber body 106a is vulcanized to a rectangular metal end plate 108a secured by bolts 109a to the corresponding cross bar 25 of the body B.

It will be seen that the form of rear end or drive axle suspension shown in Fig. 22 operates in the same manner as the form shown in Figs. 1 and 6–9 except that the ends of the axle trusses 92 are tied together by the transverse channels 120 so as to form a rigid horizontal rectangular structure fixed to the axle ends and that the corners of this rectangular structure are severally secured to the cross bars 25 of the body by tandem shear rubber springs.

Figure 23

If for any reason lateral axle movement is not desired, either axle can be locked against lateral movement as illustrated in Fig. 23. Thus by the provision of the bracket 125 on the axle and the bracket 126 on the body above the axle and by connecting these brackets with the generally horizontal link 128 extending parallel with the axle lateral movement of the axle is positively prevented.

From the foregoing it will be seen that the present invention provides a suspension for either the steering or drive axles of a vehicle which has the advantages and achieves the objectives enumerated and while the invention is illustrated in connection with a passenger bus suspension, features, particularly the self-steering feature illustrated in Fig. 21, are applicable to single and tandem axle suspensions for other highway vehicles. By the term "rubber" as used in the accompanying claims is meant synthetic as well as natural rubber and also mixtures of natural and synthetic rubber.

I claim:

1. A spring suspension for a highway vehicle having an axle with wheels journaled on the ends thereof and a body, comprising a bar member secured to each end of said axle and having an upright face extending transversely of said body, a body member secured to said body at each end of said axle and having an upright face extending transversely of said body, a body of rubber at each end of said axle and interposed between the corresponding pair of said faces and yieldingly permitting lateral movement of said axle with reference to said body, at least one of said faces at each end of said axle inclining in a horizontal direction with reference to each other to toe out toward one end of the vehicle whereby said lateral movement of said axle with reference to said body is translated into a turning movement of said axle about a vertical axis.

2. A spring suspension for a highway vehicle having an axle with wheels journaled on the ends thereof and a body, comprising a bar structure secured to each end of said axle, an abutment member on each bar structure and having an upright face extending transversely of said body, a second abutment member secured to said body at each end of said axle and having an upright face opposing and generally parallel with the upright face of the companion first abutment member, and a shear rubber body interposed between and secured to said parallel faces of each companion pair of said abutment members whereby said shear rubber bodies permit vertical and lateral movement of said axle with reference to said body, said parallel faces at opposite sides of the vehicle inclining in a horizontal direction with reference to each other to toe out toward one end of the vehicle whereby lateral movement of said axle with reference to said body is translated into a turning movement of said axle about a vertical axis.

3. A spring suspension as set forth in claim 2 wherein each bar structure has a pair of said abutment members at each end thereof and on opposite sides, fore-and-aft, of the axle, and said body has a second abutment member opposing each of said first abutment members, and wherein a pair of said shear rubber bodies are severally interposed between the companion first and second abutment members at each side of the vehicle.

4. In a highway vehicle having an axle, a pair of wheels severally journaled on the ends of said axle, a body having main longitudinal side bars and a pair of cross bars connecting said main longitudinal side bars with said cross bars severally arranged fore-and-aft and generally parallel with said axle, and a bar structure secured to each end of each axle at the inner sides of said wheels and extending transversely of said axles with the ends of said bar structures in horizontally spaced relation to said cross bars; the combination therewith of a spring suspension between at least one end of each of said bar structures and the corresponding cross bar, comprising a pair of thin, broad rubber bodies having opposite generally parallel broad faces and said bodies arranged with two of their broad faces in face-to-face relation to each other, said rubber bodies having different cross sectional areas parallel with their broad faces thereby to have different degrees of flexure parallel with said broad faces, an intermediate plate secured to said two of said broad faces and uniting said rubber bodies to act in tandem, an end plate secured to another broad face of one of said rubber bodies and secured to a corresponding end of a corresponding bar structure to extend upwardly and also transversely of said body, a second end plate secured to the other of said broad faces of the other rubber body and secured to the adjacent end of the corresponding cross bar, and a stop limiting vertical movement of said intermediate plate relative to the end plate secured to that rubber body having the smaller cross sectional area in that direction to prevent overstressing of that rubber body having the smaller cross sectional area.

5. The combination set forth in claim 4 wherein said stop is a resilient stop.

6. The combination set forth in claim 4 wherein said stop comprises a horizontal stop flange on said intermediate plate with said horizontal stop flange projecting away from the end plate secured to that rubber body having the smaller cross sectional area, a second horizontal stop flange secured to the end plate secured to that rubber body having the smaller cross sectional area and projecting into the path of downward movement of said first mentioned horizontal stop flange, and a rubber bumper interposed between said flanges and secured to one of said flanges.

7. The combination set forth in claim 6 wherein said horizontal stop flanges are arranged to bias said intermediate plate toward said end plate secured to that rubber body having the smaller cross sectional area in response to the pressure exerted through said rubber bumper.

8. In a highway vehicle having an axle, a pair of wheels severally journalled on the ends of said axle, a body having main longitudinal side bars and a pair of cross bars connecting said main longitudinal side bars with said cross bars severally arranged fore-and-aft and generally parallel with said axle, and a bar structure secured to each end of each axle at the inner sides of said wheels and extending transversely of said axles with the ends of said bar structures in horizontally spaced relation to said cross bars; the combination therewith of a spring suspension between at least one end of each of said bar structures and the corresponding cross bar, comprising a transverse bar interconnecting the front ends of said bar structures, a transverse bar interconnecting the rear ends of said bar structures, and a shear rubber body having one face operatively secured to each end of each bar structure and its opposite face operatively secured to the adjacent end of the corresponding cross bar, said shear rubber bodies each flexing vertically to permit upward movement of each end of said axle relative to said body.

9. The combination set forth in claim 8 wherein said rubber bodies are attached to said transverse bars.

10. In a highway vehicle having an axle with a pair of wheels severally journalled on the ends thereof and a body having main longitudinal side bars and a pair of cross bars connecting said main longitudinal side bars and severally arranged fore-and-aft and generally parallel with and adjacent to said axle, the combination therewith of spring suspension between said body and each end of said axle, comprising an axle bracket fast to each end of said axle, a horizontal axle bar arranged above each end of said axle and extending transversely of said axle, means removably securing each of said axle bars to the corresponding axle bracket, an upright abutment member fixed at its upper end to each end of each of said axle bars, a diagonal brace fixed at its lower end to the lower end of each of said abutment members and at its upper end to an intermediate part of the corresponding axle bar and a shear rubber body having one face secured to each upright abutment member and its opposite face secured to the adjacent end of the corresponding cross bar, said shear rubber bodies each flexing vertically to permit upward movement of each end of said axle relative to said body.

11. In a highway vehicle having an axle with a pair of wheels severally journalled on the ends thereof and a body having main longitudinal side bars and a pair of cross bars connecting said main longitudinal side bars and severally arranged fore-and-aft and generally parallel with said axle, the combination therewith of a spring suspension between said body and each end of said axle, comprising an axle bracket fast to each end of said axle, an upper axle bar arranged above and extending transversely of said axle, means removably securing each upper axle bar to the corresponding axle bracket, an upright abutment member fixed at its upper end to each end of each of said upper axle bars, a bottom axle bar generally parallel with said upper axle bar and interposed between the lower ends of the abutment members at each side of the vehicle, means removably securing each end of each of said lower axle bars to the lower end of the corresponding abutment member, and a shear rubber body having one face secured to each of said abutment members and its opposite face secured to the adjacent end of the corresponding cross bar, said shear rubber bodies each flexing vertically to permit upward movement of each end of said axle axle relative to said body.

12. In a highway vehicle having an axle, a pair of wheels severally journalled on the ends thereof, a body having main longitudinal side bars and a pair of cross bars connecting said main longitudinal side bars and severally arranged fore-and-aft and generally parallel with and adjacent said axle, and a bar structure secured to each end of said axle at the inner sides of said wheels and extending transversely of said axles with its ends in horizontally spaced relation to said cross bars, the combination therewith of a spring suspension between said body and bar structures, comprising an abutment member on each end of each bar structure and having an upright face extending transversely of said body in opposition to the corresponding cross bar, said cross bars each having an upright face arranged in opposing, generally parallel, spaced relation with said upright face of a corresponding abutment member carried by said bar structures, and a shear rubber body interposed between and secured to the companion parallel faces of said abutment members and cross bars whereby said shear rubber bodies permit vertical and lateral movement of said axle with reference to said body and yieldingly resist such movement.

13. A spring suspension for a highway vehicle having an axle with a pair of wheels severally journalled on the ends thereof and a body having main longitudinal side bars and a pair of cross bars connecting said main longitudinal side bars and severally arranged fore-and-aft and generally parallel with said axle, comprising a bar structure secured to each end of said axle at the inner sides of said wheels and extending transversely of said axle with its ends in horizontally spaced relation to said cross bars, an upright abutment member secured to each end of each bar structure, a companion upright abutment member on each cross bar associated with each of said first abutment members, said companion pairs of upright abutment members having generally parallel opposed upright faces extending transversely of the vehicle body, and a shear rubber spring having opposite faces secured to said opposed generally parallel faces of each companion pair of said abutment members, said shear rubber springs each flexing vertically to permit upward movement of each end of said axle relative to said vehicle body, and said opposed generally parallel faces of said pairs of upright abutment members at one side of said vehicle being inclined in a horizontal direction with reference to the opposed generally parallel faces of said pairs of upright abutment members at the other side of said vehicle to toe out toward one end of the vehicle whereby lateral movement of said axle with reference to the vehicle body is translated into a turning movement of said axle about a vertical axis.

References Cited in the file of this patent

UNITED STATES PATENTS

| | | |
|---|---|---|
| 2,216,715 | Ledwinka | Oct. 1, 1940 |
| 2,290,620 | Brown | July 21, 1942 |
| 2,417,214 | Roos | Mar. 11, 1947 |
| 2,536,337 | Whitlow | Jan. 2, 1951 |
| 2,596,904 | Krotz | May 13, 1952 |

FOREIGN PATENTS

| | | |
|---|---|---|
| 352,467 | Italy | Sept. 15, 1937 |